T. L. DIRKSEN.
SELF DUMPING WHEELBARROW.
APPLICATION FILED AUG. 16, 1912.
1,071,717.
Patented Sept. 2, 1913.
2 SHEETS—SHEET 1.
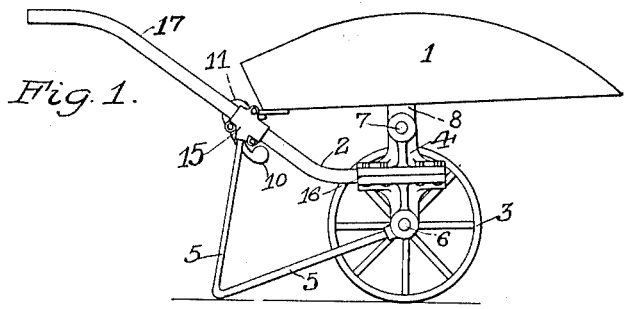
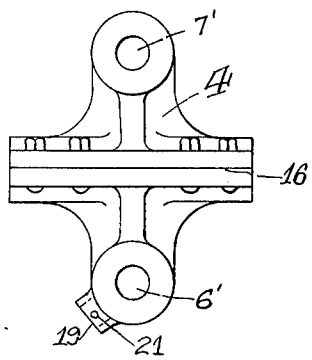
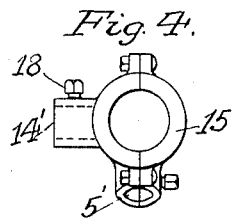
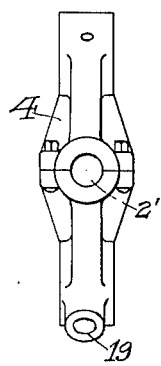
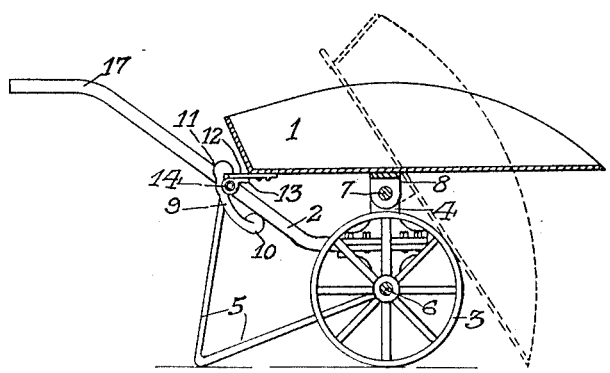
WITNESSES
W R Pratt.
Edward Maisel.
THEODOR L. DIRKSEN
INVENTOR
BY F. D. Silloway.
ATTORNEY

T. L. DIRKSEN.
SELF DUMPING WHEELBARROW.
APPLICATION FILED AUG. 16. 1912.

1,071,717.

Patented Sept. 2, 1913.

2 SHEETS—SHEET 2.

WITNESSES
W. R. Pratt
Edward Maisel.

THEODOR L. DIRKSEN
INVENTOR

BY F. D. Silloway
ATTORNEY

UNITED STATES PATENT OFFICE.

THEODOR L. DIRKSEN, OF SPRINGFIELD, ILLINOIS, ASSIGNOR OF ONE-HALF TO HOWARD W. LE TISSIER, OF BATH, ILLINOIS, AND ONE-HALF TO WALTER HARTTER, OF SPRINGFIELD, ILLINOIS.

SELF-DUMPING WHEELBARROW.

1,071,717.   Specification of Letters Patent.   Patented Sept. 2, 1913.

Application filed August 16, 1912. Serial No. 715,470.

*To all whom it may concern:*

Be it known that I, THEODOR L. DIRKSEN, a subject of the German Emperor, residing at Springfield, in the county of Sangamon and State of Illinois, have invented new and useful Improvements in Self-Dumping Wheelbarrows, of which the following is a specification.

My invention relates to improvements in wheel barrows or hand trucks, of the type employing one traction wheel on which is mounted a frame having handles.

The object of my invention is to provide a wheel barrow or hand truck in which the contents of the bed may be easily and speedily dumped, without the necessity of elevating the handles to a position above the traction wheel, or of turning the truck over on one side.

The preferred embodiment of my invention is hereinafter described and claimed and shown in the accompanying drawings.

Figure 6:
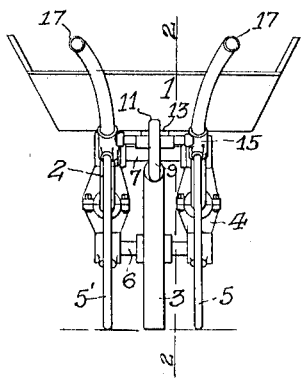
Figure 7:
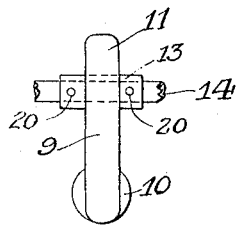
Figure 8:
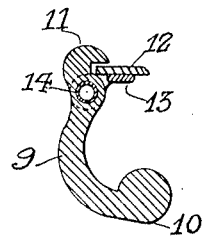
Figure 9:
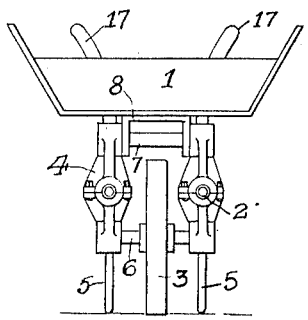

In the drawings:—Figure 1 is a side elevation of the wheel barrow of my invention. Fig. 2 is a side elevation of one of the bearing members. Fig. 3 is a front elevation of one of the bearing members. Fig. 4 is an end elevation of one of the frame connection members. Fig. 5 is a vertical sectional view of the wheel barrow, showing the position of the bed when dumped, taken on line 2—2 of Fig. 6. Fig. 6 is a rear elevation of the wheel barrow. Fig. 7 is a detail view showing the locking and tripping member. Fig. 8 is a sectional detail view of the locking and tripping member. Fig. 9 is a front elevation of the wheel barrow.

Referring to the drawings, 1 designates a bed mounted on axle 7 by means of bracket 8 attached to the under side of the bed on a line just back of the center line of equilibrium of the bed. Parallel to axle 7 is axle 6 and midway of its length is traction wheel 3. Axles 6 and 7 are carried by bearing members 4, axle 6 revolving in the bearing members and axle 7 being rigidly attached thereto. Bearing members 4 are divided into two parts, an upper and a lower portion, united at face 16 by bolts. Faces 16 of the upper and lower portions have grooves designated by 2' to receive the tubular frame members 2, which are clamped therein by means of the bolts uniting the upper and lower portions. Frame members 2 are extended backward and upward and form handles 17.

15 are connecting members of the frame, and are divided into two parts which are clamped together around frame members 2 and frame rest members 5 at 5'. Cross piece 14 is inserted in the openings in lugs 14' and held in rigid position therein by set screws 18. The other ends of frame rest members 5 are inserted in lugs 19 of the lower portions of bearing members 4 and secured by pins 21.

On the under side of the bed 1 is a rest member 12, which is rigidly bolted thereto, said rest member being adapted to normally set upon a seat 13 carried by cross piece 14 of the frame. Rest member 13 is supported by two rings surrounding cross piece 14 and is held in place by pins 20 driven into said cross piece. About cross piece 14, between the two supporting rings of rest member 13, is pivoted a locking and tripping member, having a latch 11 at its upper end, a lever 9, and a weight 10 at the other end. (See Fig. 8 where this device is best illustrated.)

The bed 1 being revoluble about axle 7, and having a tendency to revolve forward by reason of the location of axle 7 back of the center line of equilibrium of the bed, latch 11 holds the bed balanced by securing rest member 12 in contact with seat 13. Weight 10 draws down lever 9 which forces latch 11 into the latched position.

In dumping the contents of the bed, the operator presses lever 9 with his foot, which draws back latch 11, allowing the bed to revolve forward, dumping its contents. When the bed is swung back, the latch again catches rest member 12, and weighted lever 9 automatically secures the same.

It will be readily seen that my invention provides a wheel barrow which may be speedily dumped without the necessity of great physical exertion on the part of the operator.

Changes within the spirit and scope of the appended claims may be made, as it is obvious that the details of construction may be varied in many ways.

Having thus described my invention, what I claim is:—

1. In a self dumping wheel barrow, the combination of pairs of upper and lower bearing members having abutting face portions and devices for securing said face portions together, the upper members having upwardly projecting bearings and the lower members having downwardly projecting bearings, a bed pivotally supported by said upper bearings, the face portions of each pair being grooved and handle bars disposed in said grooves and adapted to be locked by said devices, a fitting for each handle bar, a cross bar connected with said fittings, a substantially V-shaped rest for each handle bar having one terminal connected with the fitting of such bar and having its other terminal connected with the lower bearings on the corresponding side, an axle journaled in said lower bearings, a supporting wheel on said axle, and catch mechanism on said cross bar for holding said bed in a normal position, substantially as described.

2. In a self dumping wheel barrow, the combination of a frame comprising upper and lower bearing members having abutting face portions, handle bars between said face portions, devices for locking said face portions in abutting relation and securing said handle bars in place therebetween, fittings for said handle bars, rests secured to said fittings and to the lower bearing members, a cross bar secured to said fittings, a bed mounted on the upper bearing members, and a wheel mounted in the lower bearing members, substantially as described.

THEODOR L. DIRKSEN.

Witnesses:
WALTER HARTTER,
J. S. GARRETSON.